United States Patent
Spethmann

[15] 3,692,240
[45] Sept. 19, 1972

[54] PNEUMATIC CONTROL SYSTEM

[72] Inventor: Donald H. Spethmann, Arlington Heights, Ill.

[73] Assignee: Honeywell Inc., Minneapolis, Minn.

[22] Filed: July 24, 1970

[21] Appl. No.: 57,919

[52] U.S. Cl. .......................... 236/82, 236/1 B, 137/85
[51] Int. Cl. ...................... G05d 23/185, G05b 11/48
[58] Field of Search ...... 236/1 B, 82; 137/85, 86, 111

[56] References Cited

UNITED STATES PATENTS

| | | | |
|---|---|---|---|
| 3,568,760 | 3/1971 | Hogel | 236/1 B |
| 3,602,427 | 7/1971 | Joesting | 236/82 X |
| 2,295,149 | 9/1942 | Adams et al. | 236/1 B |
| 2,778,372 | 1/1957 | Jaquith | 137/111 |
| 3,223,105 | 12/1965 | Hogel | 137/85 |
| 3,367,352 | 2/1968 | Treble | 137/86 |

*Primary Examiner*—William E. Wayner
*Attorney*—Lamont B. Koontz

[57] ABSTRACT

A pneumatic control system for optimally controlling a condition in a plurality of zones, each zone having a thermostat or the like. Each thermostat is in communication and has proximately associated therewith valve means. The valve means are suitably interconnected and are in communication with a source of air pressure and output means, which output means provides a signal indicative of either the highest or the lowest of the output pressures of the thermostats.

8 Claims, 4 Drawing Figures

INVENTOR.
DONALD H. SPETHMANN

ATTORNEY.

INVENTOR.
DONALD H. SPETHMANN
BY
Thomas B. Kong
ATTORNEY.

PNEUMATIC CONTROL SYSTEM

BACKGROUND AND SUMMARY OF THE INVENTION

This invention relates generally to a pneumatic control system and particularly to an improvement in a pneumatic control system for optimally controlling a condition such as air temperature in a plurality of zones or regions.

The type of control system to which this invention relates typically includes a plurality of zones or regions in each of which a condition such as temperature or humidity is independently controlled. A condition responsive device, such as a thermostat, is located in each zone and adjustably controls the condition such as air temperature to a desired level. A common condition changing medium such as hot or cold water or steam, is utilized to change the condition.

Because of varied heating or cooling loads on various zones, one zone may require more condition changing media to effect control than another zone. Where both heating and cooling is available to the zones, conditions may arise where some zones require heating media whereas other zones require cooling media. In the interest of economy, it is desirable that the condition changing media is heated or cooled only to the extent required in order to maintain control in the zone having the greatest heating or cooling load. One method of providing this optimal control is to sense the highest and the lowest of the output pressures of the condition responsive devices in each of the zones. The highest pressure generally gives an indication of the greatest of the cooling demands whereas the lowest pressure gives an indication of the greatest of the heating demands. These pressures are then used to control the position of a valve or the like which controls the amount of heating or cooling media delivered to the zone coils. Intermediate pneumatic circuitry is often employed to further optimize the system.

One method of ascertaining the highest and the lowest pressures is disclosed in a co-pending application in the name of Frederick D. Joesting, Ser. No. 35,166, now U.S. Pat. No. 3,602,427. That approach involves the use of packaged high-low pressure selector which has piping communicating with each of the condition responsive devices in each of the zones. While this provides the desired function, certain installations may be so arranged that a great deal of piping is required. The invention herein disclosed provides an alternative method of selecting the highest and the lowest pressures from each of the condition responsive devices which requires less piping. Additionally, this invention provides for the use of a valve or valve means which may be an integral part of the condition responsive device so that no additional package or apparatus is necessary beyond the condition responsive device itself. Only one length of piping interconnecting all the condition responsive devices is necessary to provide either the high or low pressure selection function, and only two lengths of piping for both the high and low pressure selection functions.

Additional advantages of this invention will become apparent upon reviewing the drawing and perusing the detailed description of the invention.

DESCRIPTION OF THE DRAWING

In FIG. 1 a plurality of regions are generally indicated by the numbers 10, 11, and 12. In each region is a condition responsive means such as a thermostat or humidistat 13 the output of which is connected to a control device such as a valve or an actuator 14. A regulated source of air pressure 15 is connected via conduit 16 to each of the condition responsive means 13. Proximately associated with each of the condition responsive means is a valve means 17. While the valve means 17 is illustrated as being separate from the condition responsive means 13, it is clear that such a valve means may be incorporated into and be an integral part of the condition responsive means 13. Serially interconnecting the valve means 17 is conduit 18. Connected to one of the valve means is conduit 19 which provides an exhaust function. Connected to another one of the valve means is an output means 20 which includes a connection having a restriction 21 to the conduit 16 which is in turn connected to the source of regulated fluid under pressure 15.

Figure 4:
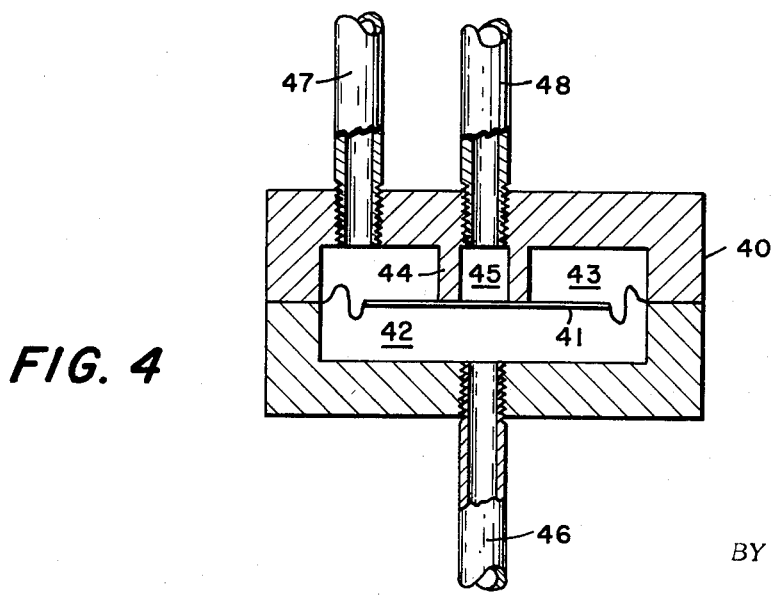
FIG. 4 is a schematic illustration of one type of valve means which may be utilized in conjunction with a condition responsive means to select the appropriate pressure.

Each of the valve means 17 is of the type disclosed in more detail in FIG. 4. While a diaphragm module type of valve means is disclosed, it is equally acceptable to use means such as check valve means to provide the valving function for each of the condition responsive means.

Figure 1:
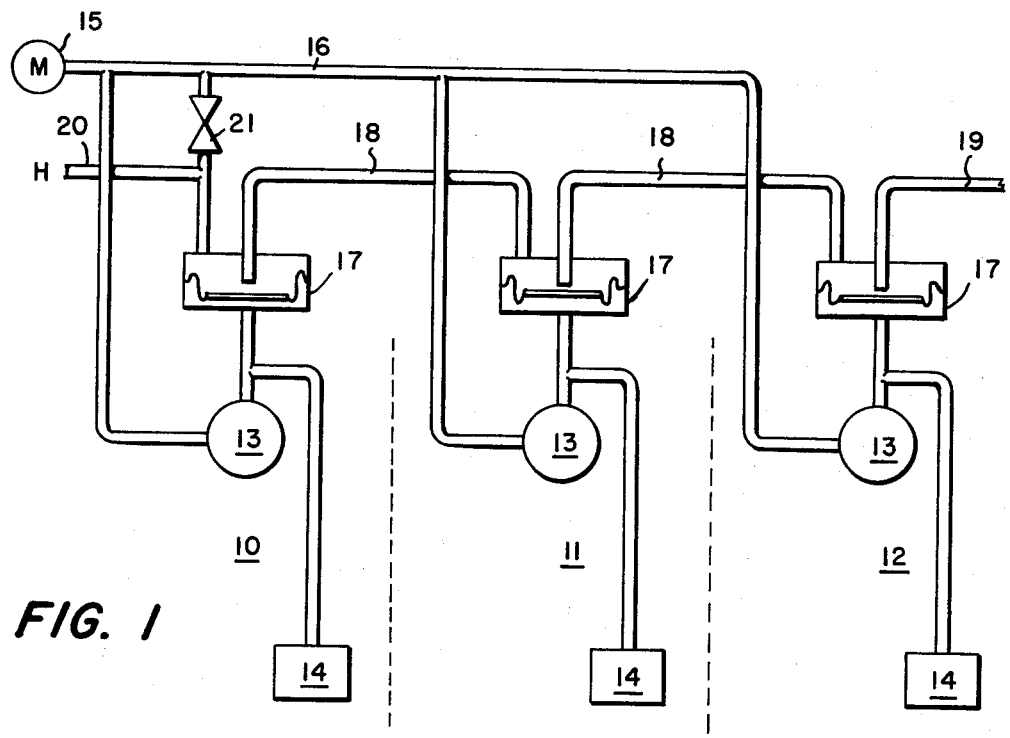
FIG. 1 is schematic illustration of a pluralzone pneumatic control system employing the instant invention wherein the highest output pressure is selected.
Figure 2:
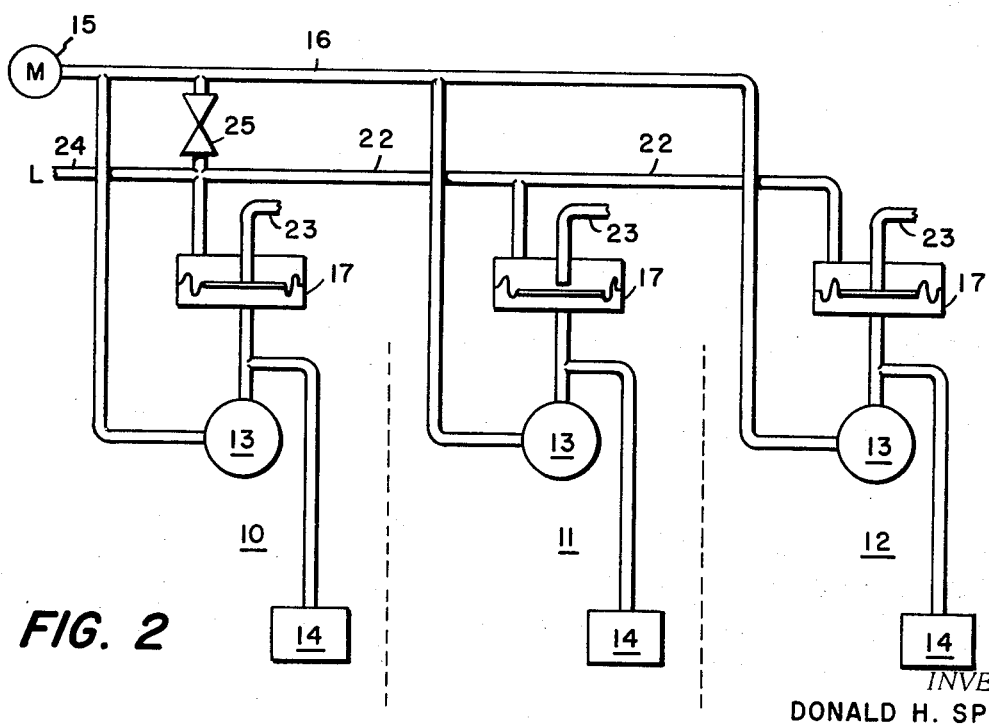
FIG. 2 is a schematic illustration of a pluralregion or zone pneumatic control system wherein the instant invention is employed to select the lowest output pressure of the condition responsive means in each region.

In FIG. 4, an enlarged view of a valve means of the type shown in FIGS. 1 and 2 is disclosed. A housing 40 is separated by a diaphragm or the like 41 dividing the housing into a control chamber 42 and flow chamber 43. Disposed within the flow chamber is an annular partition means 44 which is arranged to sealably cooperate with diaphragm 41 to open and close off a valving chamber 45 defined by the partition means 44. Connected to and communicating with control chamber 42 is an inlet 46 which is adapted to be connected to the output of its respective condition responsive means. A connection 47 is also provided for the flow chamber as well as a connection means or outlet 48 for the valving chamber.

Referring back to FIG. 1, the conduit 18, as aforementioned, serially interconnects the valve means by interconnecting the flow chambers and the valving chambers of each of the valve means. By providing the exhaust means 19, and the outlet 20 in communication through restriction 21 with the source of regulated pressure, a signal is provided at the output means 20 which is indicative of the highest output pressure of each of the condition responsive means 13. To illustrate this function, one may assume the highest of the pressure outputs of the condition responsive means is provided by the condition responsive means 13 in region 11. If this is so, diaphragm 41 of the valve means associated with region 11 will modulate so that the pressure in flow chamber 43 will be equal to the pressure in the control chamber 42. Because the pressure in chamber 43 is now higher than the output pressures of the condition responsive means in regions 10 and 12, the diaphragms in the valve means associated with the latter two regions will be held open to provide an exhaust means or function at 19 and to provide a relatively unobstructed path to the output at 20. Hence the output signal 20 will be indicative of the pressure output of the condition responsive means in region 11 which, as assumed, is the highest of the pressure outputs.

FIG. 2 is an illustration of a pneumatic control system like that disclosed in FIG. 1 but where the lowest pressure output of the condition responsive means in each of regions is provided at the output 24. Conduit 22 interconnects in parallel the flow chambers of each of the valve means 17. Conduits 23 provide an exhaust function for each of the valving chambers of the valve means 17. Again a restriction 25 is provided in the connection between the output 24 and the conduit connected to the regulated source of pressure 15.

If one assumes the lowest pressure output is provided by the condition responsive means in region 11, the diaphragm 41 of the proximately associated valve means will modulate so that the pressure in flow chamber 43 will equal the pressure in the control chamber 42. Because the output pressures of the condition responsive means in regions 10 and 12 will be higher, the diaphragms in the proximately associated valve means in the latter regions will close off the outlet chambers so that the signal provided at outlet 24 will be indicative of the pressure in the control chamber 42 of the valve means proximately associated with the condition responsive means 13 in region 11.

Figure 3:
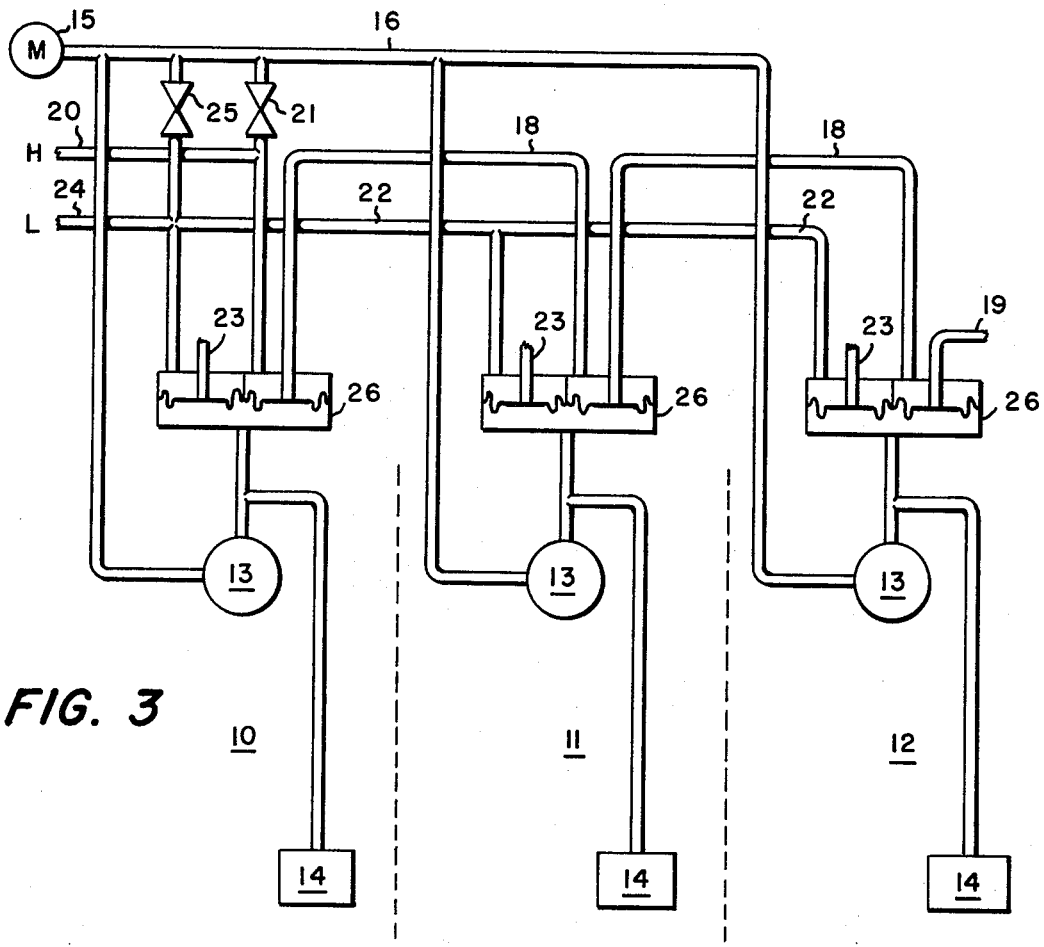
FIG. 3 is a schematic illustration of a pluralregion pneumatic control system utilizing the subject invention wherein both the highest and the lowest output pressures of the condition responsive means in the various regions are selected.

FIG. 3 discloses a system combining the features disclosed in FIGS. 1 and 2. The connections are the same so that both the highest and the lowest of the pressure outputs of the condition responsive means in the various regions are provided at the outputs 20 and 24 respectively. In FIG. 3 the valve means 26 is essentially a combination of two of the valve means of the type disclosed in FIG. 4 but where the control chamber 42 is common to both of the valve means of the type disclosed in FIG. 4. Obviously, this is an expedient feature and one could just as easily provide two separate valve means. The low pressure output function in FIG. 3 is provided in the same fashion as it is provided in FIG. 2. Likewise, the high pressure function is the same as described in connection with FIG. 1.

While specific embodiments of valve means have been disclosed herein, one does not depart from the scope of the invention by using alternative means. Accordingly, it is intended that the scope of the invention be limited only by the scope of the appended claims.

The embodiments of the invention in which an exclusive property or right is claimed are defined as follows:

1. In a pneumatic temperature control system for controlling temperature in a plurality of regions, the system including pneumatic thermostat means in each of the regions, first conduit means interconnecting each thermostat means with a regulated supply of fluid under pressure, each thermostat means having a branch line pressure output indicative of the temperature in the associated region, and means communicating each branch line pressure output to means for altering the temperature of the associated region, the improvement comprising;

valve means proximately associated with each of the thermostat means, each valve means being in communication with and under the control of the branch line pressure output of the associated thermostat means;

second conduit means interconnecting the valve means; and output means in communication with the second conduit means for providing a fluid pressure indicative of the branch line pressure of the thermostat means subject to a most extreme of the temperatures in the plurality of regions.

2. The control system according to claim 1 wherein said output means provides a pressure indicative of the branch line pressure of the thermostat means subject to the highest of the temperatures in the plurality of regions.

3. The control system according to claim 1 wherein said output means provides a pressure indicative of the branch line pressure of the thermostat means subject to the lowest of the temperatures in the plurality of regions.

4. The control system according to claim 1 wherein said output means provides two pressures, one of which is indicative of the branch line pressure of the thermostat means subject to the highest of the temperatures in the plurality of regions, and one of which is indicative of the branch line pressure of the thermostat means subject to the lowest of the temperatures in the plurality of regions.

5. The control system according to claim 1 wherein each of said valve means comprises:

housing means;

diaphragm means dividing said housing means into a control chamber and flow chamber, said control chamber being adapted to receive the branch line output pressure from the proximately associated thermostat means; and partition means disposed within the flow chamber and arranged to operate in sealable relation with the diaphragm means to further define a valving chamber.

6. The control system according to claim 5 wherein said second conduit means includes means serially interconnecting the flow and valving chambers of said valve means, an exhaust means communicates with the valving chamber of one of said valve means, and said output means communicates with the flow chamber of another one of said valve means and communicates with said regulated supply of fluid through a restriction, whereby the output means provides a pressure indicative of the branch line pressure of the thermostat means subject to the highest of the temperatures in the plurality of regions.

7. The control system according to claim 5 further comprising:

exhaust means connected to the valving chambers of each of said valve means;

said second conduit means including means interconnecting in parallel the flow chambers of each of said valve means; and said output means communicating with said second conduit means and communicating with said regulated supply of fluid through a restriction whereby the output means provides a pressure indicative of the branch line pressure of the thermostat means subject to the lowest of the temperatures in the plurality of regions.

8. The control system according to claim 7 further comprising: second valve means proximately associated with each of said thermostat means; third conduit means including means serially interconnecting the flow and valving chambers of the second valve means; exhaust means communicating with the valving chamber of one of said second valve means; and second output means communicating with the inlet chamber of another one of said second valve means and communicating with said regulated supply of fluid through a restriction, whereby said second output means provides a pressure indicative of the branch line pressure of the thermostat means subject to the highest of the temperatures in the plurality of regions.

* * * * *